US012803971B2

(12) United States Patent
Huo et al.

(10) Patent No.: US 12,803,971 B2
(45) Date of Patent: Nov. 17, 2026

(54) TRUSTED PROBER IN CLOUD-BASED CONTAINER ORCHESTRATION ENVIRONMENTS

(71) Applicant: International Business Machines Corporation, Armonk, NY (US)

(72) Inventors: Qi Feng Huo, Beijing (CN); Da Li Liu, Beijing (CN); Yuan Yuan Wang, Beijing (CN); Lei Li, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 18/901,193

(22) Filed: Sep. 30, 2024

(65) Prior Publication Data

US 2026/0095442 A1 Apr. 2, 2026

(51) Int. Cl.
*H04L 29/06* (2006.01)
*H04L 9/32* (2006.01)
*H04L 9/40* (2022.01)

(52) U.S. Cl.
CPC .......... *H04L 63/0823* (2013.01); *H04L 9/321* (2013.01)

(58) Field of Classification Search
CPC ............................ H04L 63/0823; H04L 9/321
See application file for complete search history.

(56) References Cited

U.S. PATENT DOCUMENTS 5,892,904 A * 4/1999 Atkinson ................ G06F 21/64 713/170
6,189,097 B1 * 2/2001 Tycksen, Jr. .......... H04L 9/3263 713/100

(Continued)

FOREIGN PATENT DOCUMENTS

CN 115695529 A 2/2023
CN 116089075 5/2023

OTHER PUBLICATIONS

Gabriel P. Fernandez et al., Secure Container Orchestration in the Cloud: Policies and Implementation, Apr. 8, 2019, ACM, pp. 138-145. (Year: 2019).*

(Continued)

*Primary Examiner* — Luu T Pham
*Assistant Examiner* — Fahimeh Mohammadi
(74) *Attorney, Agent, or Firm* — Yee & Associates, P.C.

(57) ABSTRACT

Validating confidential containers running application workloads in trusted execution environments is provided. It is determined whether a probe result is success indicating that a first decrypted digital certificate in a confidential container matches a second decrypted digital certificate corresponding to the confidential container in a trusted prober. In response to determining that the probe result is success indicating that the first decrypted digital certificate in the confidential container matches the second decrypted digital certificate corresponding to the confidential container in the trusted prober, it is determined that the confidential container running an application workload in a trusted execution environment of a host node is a valid confidential container having a valid digital certificate. The confidential container is allowed to run the application workload in the trusted execution environment of the host node in response to determining that the confidential container is the valid confidential container having the valid digital certificate.

17 Claims, 8 Drawing Sheets

(56) References Cited

U.S. PATENT DOCUMENTS

| | | | | |
|---|---|---|---|---|
| 10,169,574 | B2 | 1/2019 | Nesher et al. | |
| 10,362,482 | B2 | 7/2019 | Obaidi | |
| 10,461,942 | B1 * | 10/2019 | Vo | H04L 9/3263 |
| 10,972,265 | B2 | 4/2021 | Novak | |
| 11,474,905 | B2 | 10/2022 | Wang et al. | |
| 12,022,012 | B1 * | 6/2024 | Shi | H04L 9/0852 |
| 2014/0013109 | A1 * | 1/2014 | Yin | H04W 12/068 713/155 |
| 2015/0319160 | A1 * | 11/2015 | Ferguson | H04L 63/12 726/10 |
| 2018/0287802 | A1 * | 10/2018 | Brickell | H04L 9/006 |
| 2019/0280883 | A1 * | 9/2019 | Fenner | H04L 9/0825 |
| 2021/0084075 | A1 | 3/2021 | Lee et al. | |
| 2021/0397698 | A1 * | 12/2021 | Li | H04L 9/3263 |
| 2022/0158856 | A1 * | 5/2022 | Maximov | H04L 9/0838 |
| 2023/0385051 | A1 | 11/2023 | Duvur et al. | |
| 2024/0007272 | A1 * | 1/2024 | Kovac | H04L 9/083 |
| 2024/0106839 | A1 * | 3/2024 | Smith | H04L 63/1441 |
| 2024/0160717 | A1 * | 5/2024 | Raghuram | G06F 21/33 |
| 2024/0267235 | A1 * | 8/2024 | Kim | H04L 9/3247 |
| 2025/0267012 | A1 * | 8/2025 | Du | H04L 9/08 |

OTHER PUBLICATIONS

Hira Siddiqui et al. Credentials as a Service Providing Self Sovereign Identity as a Cloud Service Using Trusted Execution Environments, Nov. 22, 2021, IEEE, pp. 210-216. (Year: 2021).*

Yunlong Guo et al., Building Trust in Container Environment, Oct. 31, 2019, IEEE, pp. 1-9. (Year: 2019).*

Sari Sultan et al., Container Security: Issues, Challenges, and the Road Ahead, Apr. 17, 2019, IEEE, pp. 53976-52-996. (Year: 2019).*

Author unknown, "(Optional) Adding Additional CA Certificates for Probes," IBM Documentation, Apr. 18, 2024, 4 pages, ibm.com, accessed Aug. 22, 2024, https://www.ibm.com/docs/en/tarm/8.13.3?topic=tasks-optional-adding-additional-ca-certificates-probes.

Author unknown, "Configure Liveness, Readiness and Startup Probes," Kubernetes Documentation, Jul. 27, 2024, 12 pages, kubernetes.io, accessed Aug. 22, 2024, https://kubernetes.io/docs/tasks/configure-pod-container/configure-liveness-readiness-startup-probes/.

Johnson et al., "Parma: Confidential Containers via Attested Execution Policies," Microsoft Research, Mar. 2023, pp. 1-14, microsoft.com, accessed Aug. 22, 2024, https://www.microsoft.com/en-us/research/publication/parma-confidential-containers-via-attested-execution-policies/.

Zhao et al., "Reusable Enclaves for Confidential Serverless Computing," Proceedings of the 32nd USENIX Security Symposium, Aug. 9-11, 2023, pp. 4015-4032, usenix.org, accessed Aug. 22, 2024, https://www.usenix.org/conference/usenixsecurity23/presentation/zhao-shixuan.

No Author, "[RFC] Initdata Specification for Confidential Containers #171", https://github.com/confidential-containers/confidential-containers/issues/171#issuecomment-1922821565, Nov. 9, 2023, 18 pages.

* cited by examiner

CONTAINER DESCRIPTOR
400

```
apiVersion: v1
kind: Container
metadata:
  name: mycontainer
  labels:
    app: myapp
  annotations:
402 → trust.prober.com/probe: "true"
spec:
 containers:
 -name: customer_tee_application
  image: custom_registry/custom_app_image:latest
  ports:
  -containerPort: 8080
404 { -LivenessProbe:
       httpGet:
         path: /trusted-prober-service
         port: 8080
      RestartPolicy: Never
 initContainers:
406 → -name: init-data
  image: busybox:latest
  command: ['sh', '-c', 'echo "Initialization complete."']
 volumes:
 -name: secret-volume
  secret:
    secretName: tls-secret
---
apiVersion: v1
kind: Secret
metadata:
  name: tls-secret
type: Opaque
data:
408 → certificate: U29tZSBkYXRhIHdpdGggc2VjcmV0IHN0cmluZw==
```

FIG. 4

TRUSTED PROBER IN CLOUD-BASED CONTAINER ORCHESTRATION ENVIRONMENTS

BACKGROUND

The disclosure relates generally to cloud-based container orchestration environments and more specifically to managing containers in a cloud-based container orchestration environment.

A cloud-based container orchestration environment, architecture, platform, or the like, such as, for example, Kubernetes® (a registered trademark of the Linux Foundation of San Francisco, CA, USA), provides a structural design for automating deployment, scaling, and operations of containers across host nodes. A host node is a machine, either physical or virtual, where containers (i.e., application workloads) are deployed. A container is a version of a container image and is ready to run as an application corresponding to a set of services. In other words, the container image becomes the container at runtime. The container includes the environment for the application to run (e.g., file systems, environment variables, port mappings, and the like).

SUMMARY

According to one illustrative embodiment, a method is provided. It is determined whether a probe result is success indicating that a first decrypted digital certificate in a confidential container matches a second decrypted digital certificate corresponding to the confidential container in a trusted prober. In response to determining that the probe result is success indicating that the first decrypted digital certificate in the confidential container matches the second decrypted digital certificate corresponding to the confidential container in the trusted prober, it is determined that the confidential container running an application workload in a trusted execution environment of a host node is a valid confidential container having a valid digital certificate. The confidential container is allowed to continue running the application workload in the trusted execution environment of the host node in response to determining that the confidential container is the valid confidential container having the valid digital certificate. According to other illustrative embodiments, a computer system and computer program product are provided.

BRIEF DESCRIPTION OF THE DRAWINGS

FIG. 4 is a diagram illustrating an example of a container descriptor in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
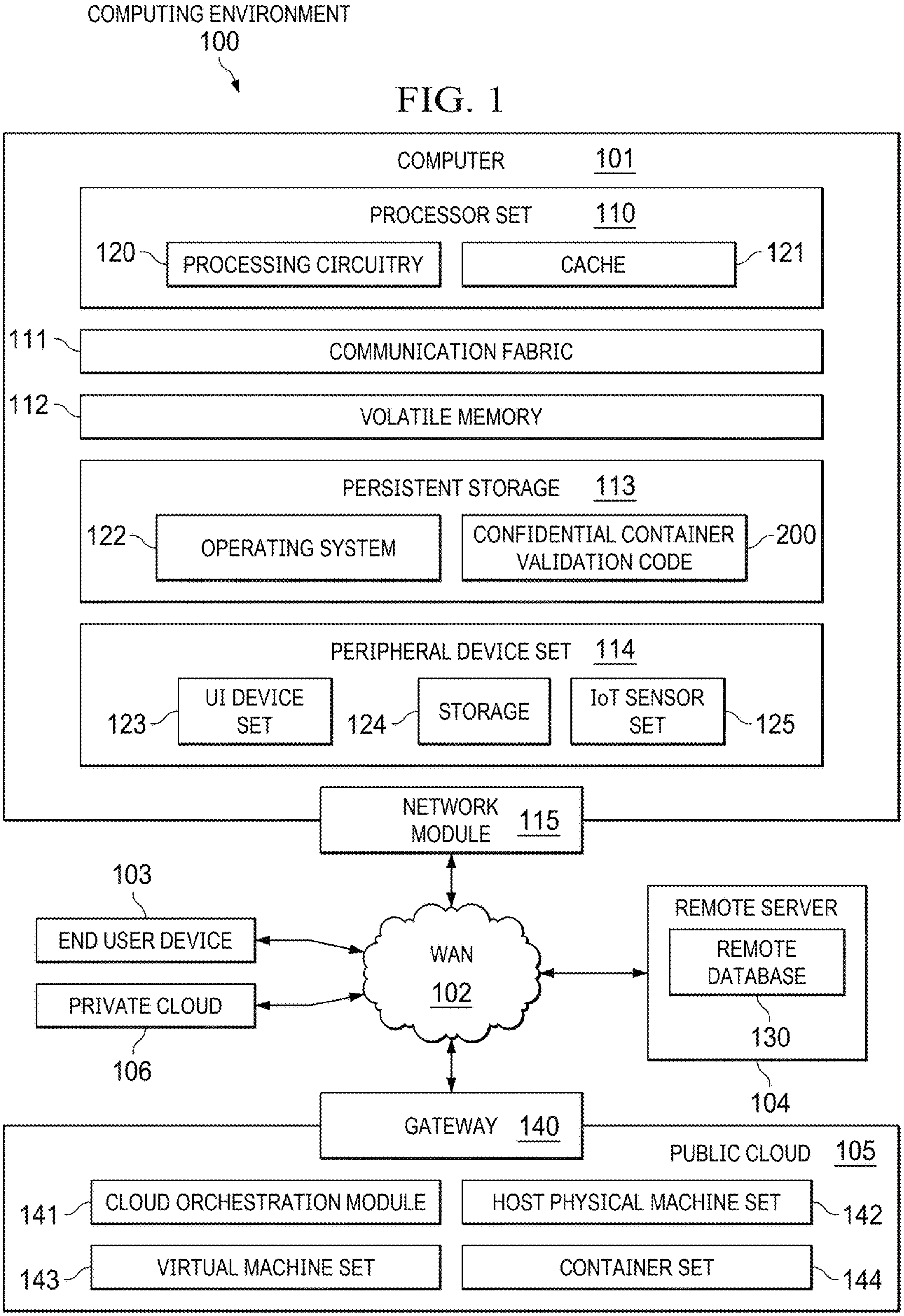
FIG. 1 is a pictorial representation of a computing environment in which illustrative embodiments may be implemented.
Figure 2:
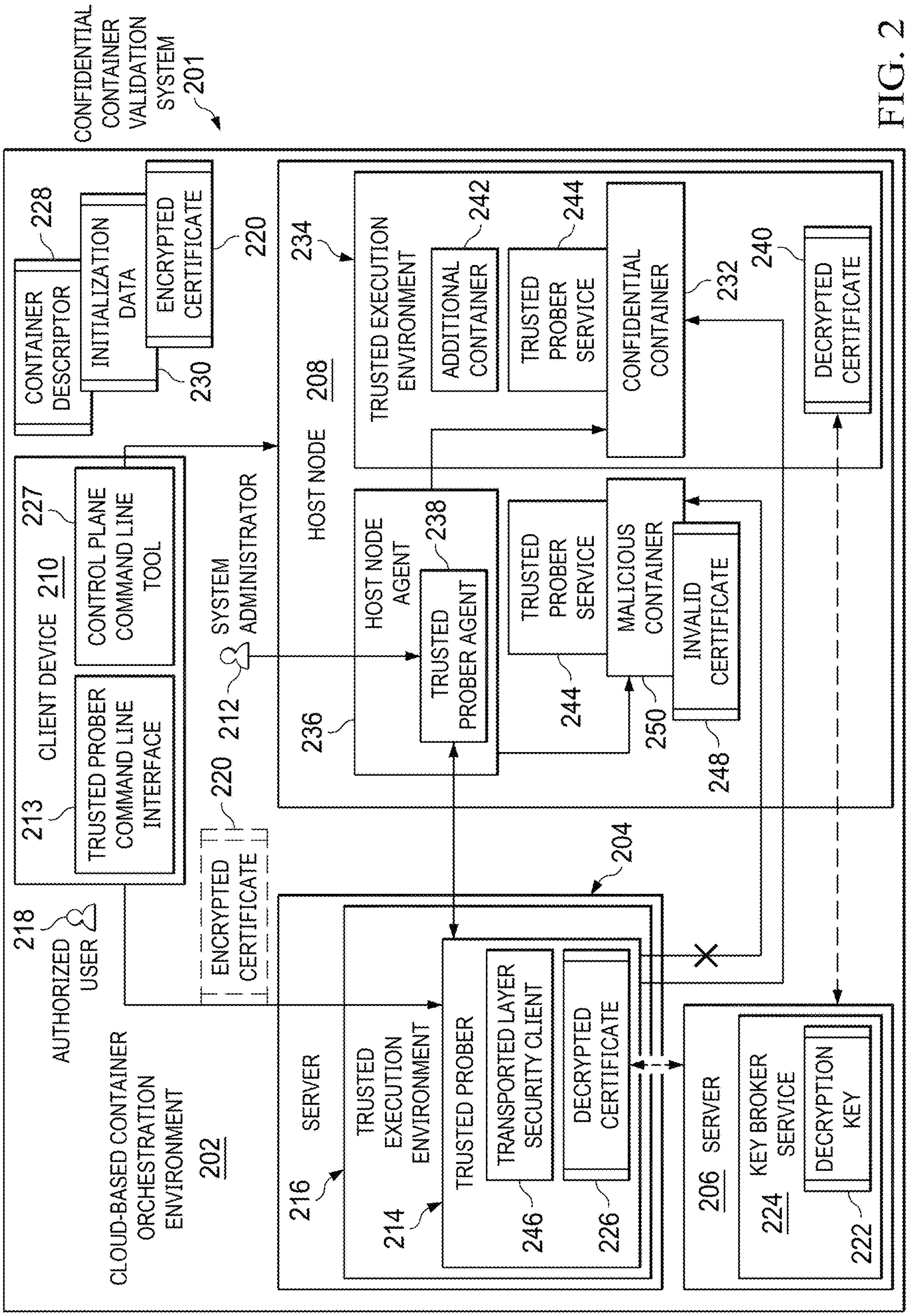
FIG. 2 is a diagram illustrating an example of a confidential container validation system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of a cloud-based container orchestration environment for the execution of at least some of the computer code involved in performing the inventive methods of illustrative embodiments, such as confidential container validation code 200. For example, confidential container validation code 200 validates authenticity of confidential containers running application workloads in trusted execution environments and terminates any malicious container having an invalid digital certificate.

In addition to confidential container validation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and confidential container validation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in confidential container validation code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator, authorized user, or the like who utilizes the confidential container validation services provided by computer 101), and may take any of the forms discussed above in connection with computer 101. EUD 103 typically receives helpful and useful data from the operations of computer 101. For example, in a hypothetical case where computer 101 is designed to provide an identified malicious container notification to the end user, this notification would typically be communicated from network module 115 of computer 101 through WAN 102 to EUD 103. In this way, EUD 103 can display, or otherwise present, the identified malicious container notification to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a confidential container validation recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Confidential computing is a cloud computing technology that protects data during processing. Confidential containers provide a set of features and capabilities to further protect container application workloads to achieve greater data security, data privacy, and runtime code integrity. A confidential container enables confidential computing by utilizing a hardware-based trusted execution environment to protect the container and data. In other words, the confidential container runs in the hardware-based trusted execution environment. A trusted execution environment is a segregated area of memory and CPU (also known as a secure enclave) that is protected from the rest of the CPU using encryption. Any data in the trusted execution environment cannot be read or tampered with by any code outside the trusted execution environment (e.g., other processes running on the same host node). Thus, the trusted execution environment provides a secure environment where sensitive computations can be performed without exposing the data to the rest of the host node or cloud-based container orchestration environment.

Attestation refers to the process of verifying the integrity and identity of the trusted execution environment to a relying party. The attestation process is similar to real-life examples of passport and background checks. A key broker service, key management service, or the like provides decryption keys for decrypting encrypted digital certificates corresponding to confidential containers running in trusted execution environments.

An issue with current solutions is how to verify that the initialization data passed to a confidential container is not tampered with. For example, a malicious trusted execution environment can occupy computing resources in a cloud-based container orchestration environment. In addition, the cloud-based container orchestration environment can be exposed to a malicious workload, which allows for malicious actions, such as, for example, scanning containers, internet protocol address spoofing, and the like. As a result, a need exists to provide a mechanism to terminate malicious containers running malicious workloads in cloud-based container orchestration environments.

Illustrative embodiments provide a new probing method in cloud-based container orchestration environments, such as, for example, Kubernetes. Utilizing illustrative embodiments, a user configures confidential containers and generates specific digital certificates. Digital or cryptographic certificates are electronic documents used to indicate ownership of a public key. Digital certificates serve various purposes, such as, for example, authenticating the identity of a user, individual, organization, device, server, website, or the like.

The trusted prober of illustrative embodiments utilizes a transport layer security client to probe confidential containers having these specific digital certificates within trusted execution environments. If a confidential container does not have a valid or correct digital certificate that matches the digital certificate stored in the trusted prober, then the result of the probe is fail. As a result of the probe failing, the transport layer security client of the trusted prober directs the host node agent (e.g., a kubelet or the like) on the host node to terminate the confidential container as being malicious having an invalid, fake, or false digital certificate.

For example, in response to receiving a probe request from a trusted prober agent located on a host node, illustrative embodiments utilize a trusted prober running in a trusted execution environment on a server of the cloud-based container orchestration environment to receive the probe request to perform a probe of a digital certificate stored in a particular confidential container running in a trusted execution environment on a host node. A trusted or authorized user (e.g., a system administrator or the like) utilizes a specific trusted prober command line interface on a client device to configure the trusted prober (e.g., uniform resource locator, protocol, type, digital certificate, and the like). In addition, illustrative embodiments utilize an additional container in the trusted execution environment of the host node to start a trusted prober service on that particular confidential container to verify that the digital certificate of that particular confidential container is valid.

Thus, illustrative embodiments provide one or more technical solutions that overcome a technical problem with an inability of current solutions to verify that the initialization data passed to a confidential container is not tampered with. As a result, these one or more technical solutions provide a technical effect and practical application in the field of cloud-based container orchestration environments.

With reference now to FIG. 2, a diagram illustrating an example of a confidential container validation system is depicted in accordance with an illustrative embodiment. Confidential container validation system 201 is implemented in cloud-based container orchestration environment 202, such as computing environment 100 in FIG. 1. Confidential container validation system 201 is a system of hardware and software components for verifying the validity of confidential containers running application workloads in trusted execution environments.

In this example, cloud-based container orchestration environment 202 includes server 204, server 206, host node 208, and client device 210. Server 204 and server 206 may be, for example, servers in host physical machine set 142 in FIG. 1. In addition, even though server 204 and server 206 are shown as being located in cloud-based container orchestration environment 202, one or both of server 204 and server 206 may be located outside of cloud-based container orchestration environment 202. Host node 208 may be, for example, computer 101 in FIG. 1. Client device 210 may be, for example, EUD 103 in FIG. 1. However, it should be noted that confidential container validation system 201 is intended as an example only and not as a limitation on illustrative embodiments. For example, cloud-based container orchestration environment 202 may include any number of cloud-based container orchestration environments, servers, host nodes, client devices, and other devices and components not shown In this example, system administrator 212 utilizes trusted prober command line interface 213 to set up trusted prober 214 in trusted execution environment 216 of server 204. Trusted prober 214 contains decrypted digital certificates and transport layer security clients for all host nodes in cloud-based container orchestration environment 202.

Authorized user 218 generates encrypted digital certificate 220 corresponding to a confidential container, such as confidential container 232, and sends encrypted digital certificate 220 to trusted prober 214 for storage. Trusted prober 214 retrieves decryption key 222 corresponding to authorized user 218 from key broker service 224 and decrypts encrypted digital certificate 220 stored in trusted prober 214 using decryption key 222 to form decrypted digital certificate 226.

Authorized user 218 utilizes control plane command line tool 227 to generate container descriptor 228 that includes initialization data 230 and encrypted digital certificate 220. Authorized user 218 also utilizes control plane command line tool 227 to deploy confidential container 232 in trusted execution environment 234 of host node 208 to run an application workload (e.g., a service) using container descriptor 228. It should be noted that container descriptor 228 contains encrypted digital certificate 220 generated by authorized user 218 above. Also, it should be noted that container descriptor 228 enables host node agent 236 to connect and communicate with trusted prober 214 via trusted prober agent 238.

Host node agent 236 starts confidential container 232 in trusted execution environment 234 of host node 208 to run the application workload. Confidential container 232 retrieves decryption key 222 corresponding to authorized user 218 from key broker service 224 and decrypts encrypted digital certificate 220 stored in confidential container 232 using decryption key 222 to form decrypted digital certificate 240.

Also, additional container 242 in trusted execution environment 234 of host node 208 starts trusted prober service 244 in confidential container 232 running the application workload in trusted execution environment 234. Further, host node agent 236 sends a probe request to trusted prober 214 in trusted execution environment 216 of server 204 via trusted prober agent 238.

In response to trusted prober 214 receiving the probe request from trusted prober agent 238, transport layer security client 246 of trusted prober 214 probes decrypted digital certificate 240 in confidential container 232 via trusted prober service 244, which was started in confidential container 232 to determine whether decrypted digital certificate 240 in confidential container 232 matches decrypted digital certificate 226 in trusted prober 214. In response to trusted prober 214 determining that decrypted digital certificate 240 in confidential container 232 does match decrypted digital certificate 226 in trusted prober 214, trusted prober 214 sends a probe result to trusted prober agent 238 indicating that confidential container 232 is a valid confidential container having a valid digital certificate. In response to trusted prober agent 238 receiving the probe result indicating that confidential container 232 is a valid confidential container, host node agent 236 allows confidential container 232 to continue running the application workload in trusted execution environment 234.

Conversely, in response to trusted prober 214 determining that invalid digital certificate 248 in malicious container 250 does not match decrypted digital certificate 226 in trusted prober 214, trusted prober 214 sends a probe result to trusted prober agent 238 indicating that malicious container 250 is an invalid confidential container having invalid digital certificate 248. In response to trusted prober agent 238 receiving the probe result indicating that malicious container 250 is an invalid confidential container, host node agent 236 terminates malicious container 250 to stop a malicious application workload in host node 208.

As a result, illustrative embodiments ensure that the initialization data passed to a confidential container is valid and has not been tampered with. Further, illustrative embodiments prevent trusted execution environments from being occupied by malicious containers running malicious workloads. In other words, illustrative embodiments prevent malicious workloads from infiltrating trusted execution environments.

Figure 3:
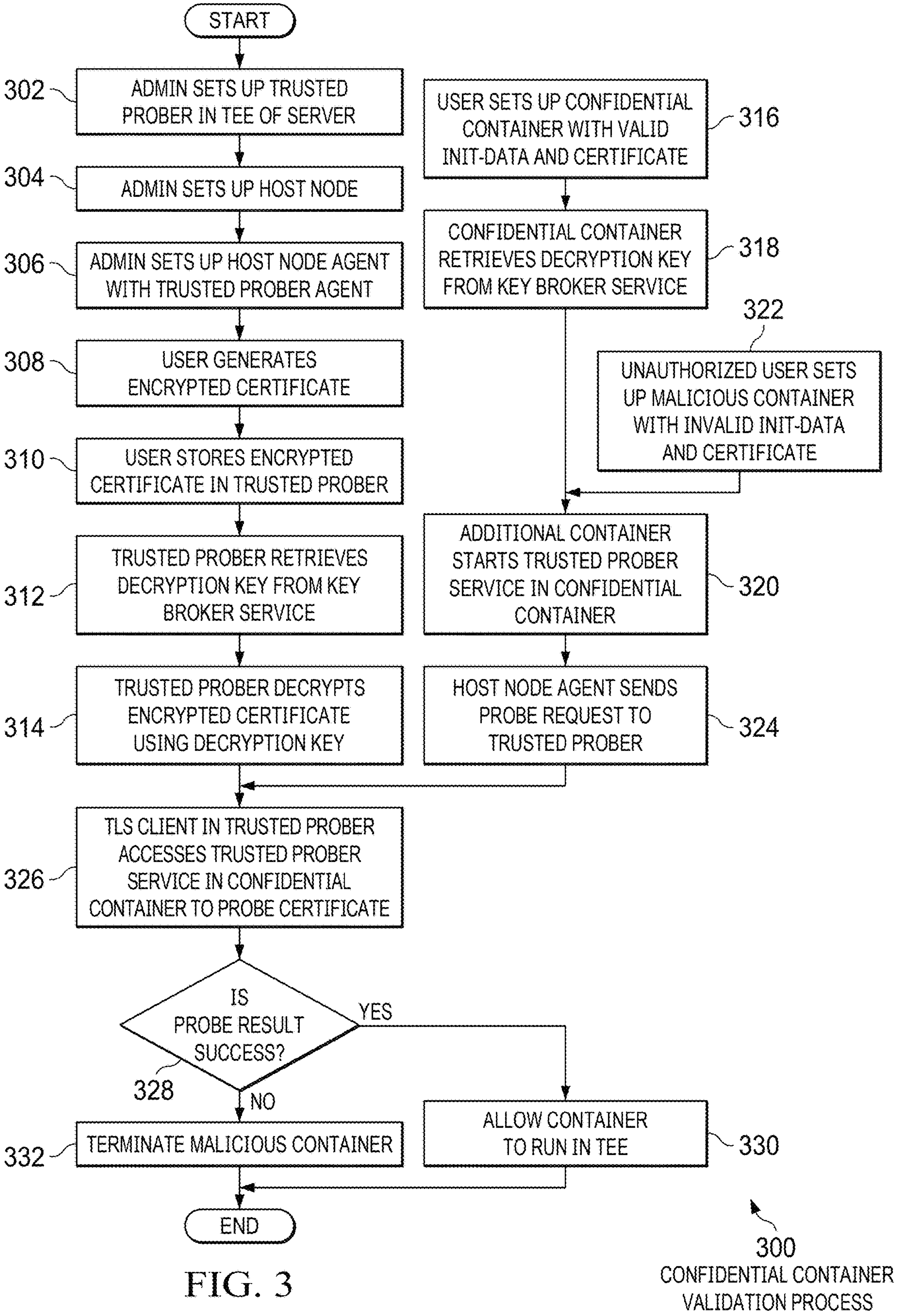
FIG. 3 is a diagram illustrating an example of a confidential container validation process in accordance with an illustrative embodiment.

With reference now to FIG. 3, a diagram illustrating an example of a confidential container validation process is depicted in accordance with an illustrative embodiment. Confidential container validation process 300 may be implemented in a confidential container validation system, such as confidential container validation system 201 in FIG. 2.

In this example, confidential container validation process 300 starts at 302 where an admin, such as system administrator 212 in FIG. 2, sets up a trusted prober in a trusted execution environment of a server, such as trusted prober 214 in trusted execution environment 216 of server 204 in FIG. 2. In addition, at 304, the admin sets up a host node, such as host node 208 in FIG. 2. Further, at 306, the admin sets up a host node agent with a trusted prober agent, such as trusted prober agent 238 in host node agent 236 in FIG. 2.

At 308, a user, such as authorized user 218 in FIG. 2, generates an encrypted digital certificate, such as encrypted digital certificate 220 in FIG. 2. At 310, the user stores the encrypted digital certificate in the trusted prober.

At 312, the trusted prober retrieves a decryption key, such as decryption key 222 in FIG. 2, from a key broker service, such as key broker service 224 in FIG. 2. Afterward, at 314, the trusted prober decrypts the encrypted digital certificate using the decryption key.

At 316, the user sets up a confidential container, such as confidential container 232 in FIG. 2, with valid initialization data and certificate, such as initialization data 230 and encrypted digital certificate 220 in FIG. 2. At 318, the confidential container retrieves the decryption key from the key broker service to decrypt the certificate in the confidential container. Furthermore, at 320, an additional container, such as additional container 242 in FIG. 2, starts a trusted prober service, such as trusted prober service 244 in FIG. 2, in the confidential container. In an alternative scenario, at 322, an unauthorized user sets up a malicious container with invalid initialization data and certificate.

At 324, the host node agent sends a probe request to the trusted prober. At 326, in response to receiving the probe request, a transport layer security client, such as transport layer security client 246 in FIG. 2, in the trusted prober accesses the trusted prober service in the container to probe the certificate.

At 328, the trusted prober makes a determination as to whether the probe result is success. The probe result is success when the certificate in the container matches the certificate stored in the trusted prober. Conversely, the probe result is fail when the certificate in the container does not match the certificate stored in the trusted prober. If the probe result is success, then, at 330, the trusted prober directs the host node agent to allow the container to continue to run in the trusted execution environment of the host node. If the probe result is fail, then, at 332, the trusted prober directs the host node agent to terminate the malicious container, such as malicious container 250 in FIG. 2.

With reference now to FIG. 4, a diagram illustrating an example of a container descriptor is depicted in accordance with an illustrative embodiment. Container descriptor 400 may be implemented in a host node, such as host node 208 in FIG. 2. Container descriptor 400 may be container descriptor 228 in FIG. 2. In this example, container descriptor 400 includes trusted prober enablement 402, trusted prober service enablement 404, initialization data 406, and digital certificate 408.

Figure 5A:
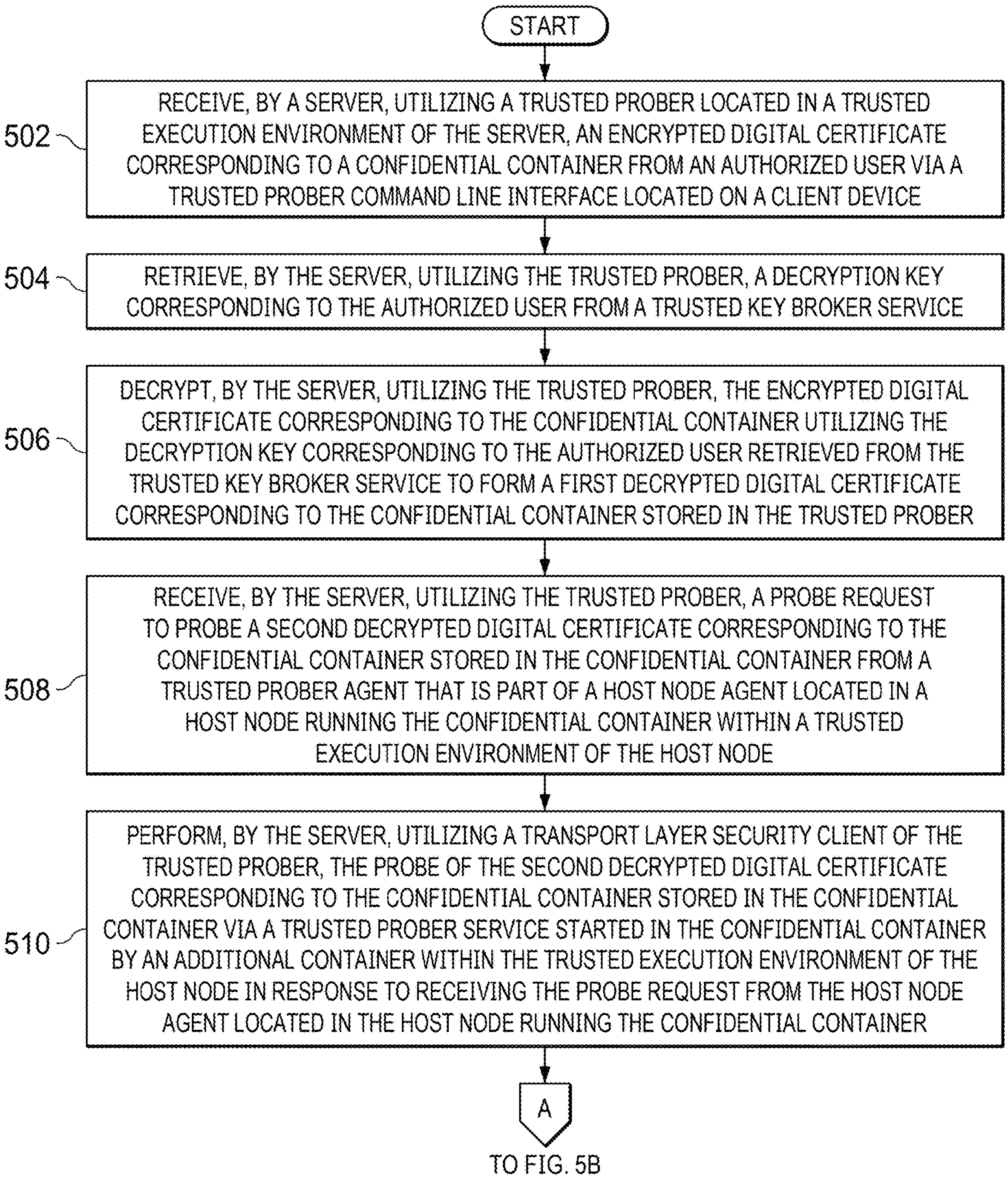
FIGS. 5A-5B are a flowchart illustrating a process for a server in accordance with an illustrative embodiment.
Figure 5B:
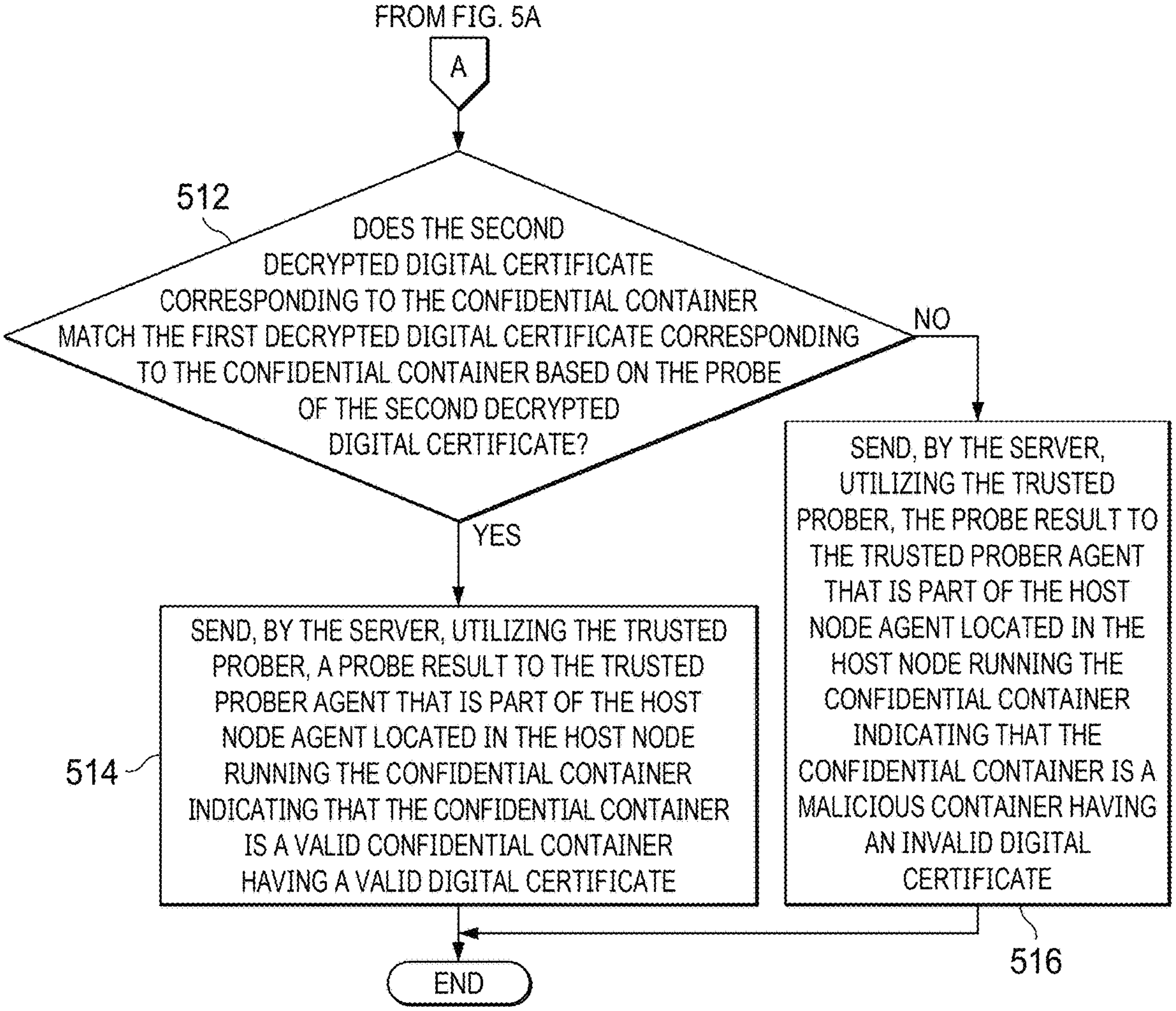

With reference now to FIGS. 5A-5B, a flowchart illustrating a process for a server is shown in accordance with an illustrative embodiment. The process shown in FIGS. 5A-5B may be implemented in a server, such as, for example, remote server 104 in FIG. 1 or server 204 in FIG. 2.

The process begins when the server, utilizing a trusted prober located in a trusted execution environment of the server, receives an encrypted digital certificate corresponding to a confidential container from an authorized user via a trusted prober command line interface located on a client device (step 502). In response to receiving the encrypted digital certificate, the server, utilizing the trusted prober, retrieves a decryption key corresponding to the authorized user from a trusted key broker service (step 504). Afterward, the server, utilizing the trusted prober, decrypts the encrypted digital certificate corresponding to the confidential container utilizing the decryption key corresponding to the authorized user retrieved from the trusted key broker service to form a first decrypted digital certificate corresponding to the confidential container stored in the trusted prober (step 506).

Subsequently, the server, utilizing the trusted prober, receives a probe request to probe a second decrypted digital certificate corresponding to the confidential container stored in the confidential container from a trusted prober agent that is part of a host node agent located in a host node running the confidential container within a trusted execution environment of the host node (step 508). In response to receiving the probe request from the trusted prober agent that is part of host node agent located in the host node running the confidential container, the server, utilizing a transport layer security client of the trusted prober, performs the probe of the second decrypted digital certificate corresponding to the confidential container stored in the confidential container via a trusted prober service started in the confidential container by an additional container within the trusted execution environment of the host node (step 510).

The server, utilizing the trusted prober, makes a determination as to whether the second decrypted digital certificate corresponding to the confidential container matches the first decrypted digital certificate corresponding to the confidential container based on the probe of the second decrypted digital certificate (step 512). If the server, utilizing the trusted prober, determines that the second decrypted digital certificate corresponding to the confidential container does match the first decrypted digital certificate corresponding to the confidential container based on the probe of the second decrypted digital certificate, yes output of step 512, then the server, utilizing the trusted prober, sends a probe result to the trusted prober agent that is part of host node agent located in the host node running the confidential container indicting that the confidential container is a valid confidential container having a valid digital certificate (step 514). Thereafter, the process terminates. If the server, utilizing the trusted prober, determines that the second decrypted digital certificate corresponding to the confidential container does not match the first decrypted digital certificate corresponding to the confidential container based on the probe of the second decrypted digital certificate, no output of step 512, then the server, utilizing the trusted prober, sends the probe result to the trusted prober agent that is part of the host node agent located in the host node running the confidential container indicting that the confidential container is a malicious container having an invalid digital certificate (step 516). Thereafter, the process terminates.

Figure 6A:
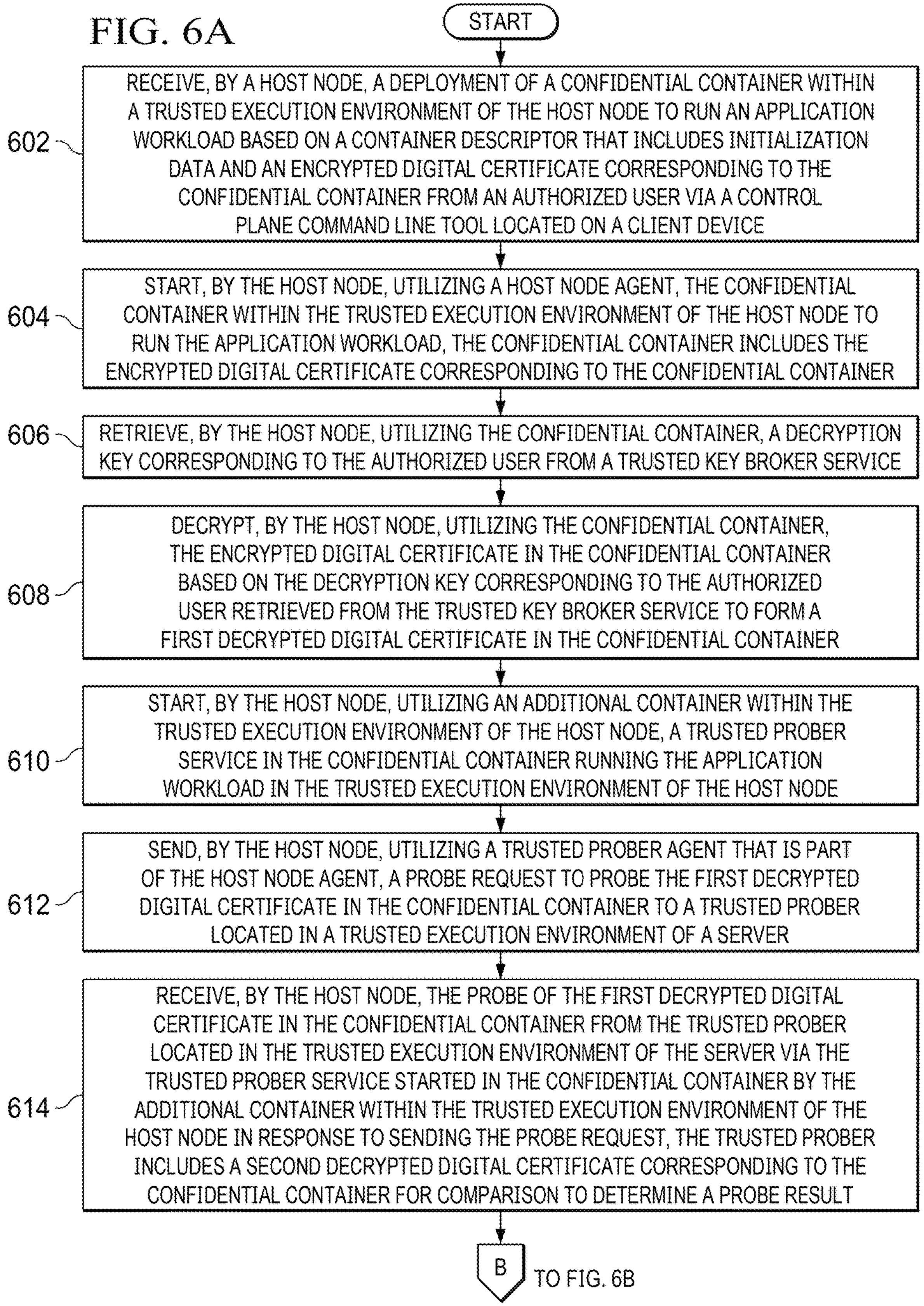
FIGS. 6A-6B are a flowchart illustrating a process for a host node in accordance with an illustrative embodiment.
Figure 6B:
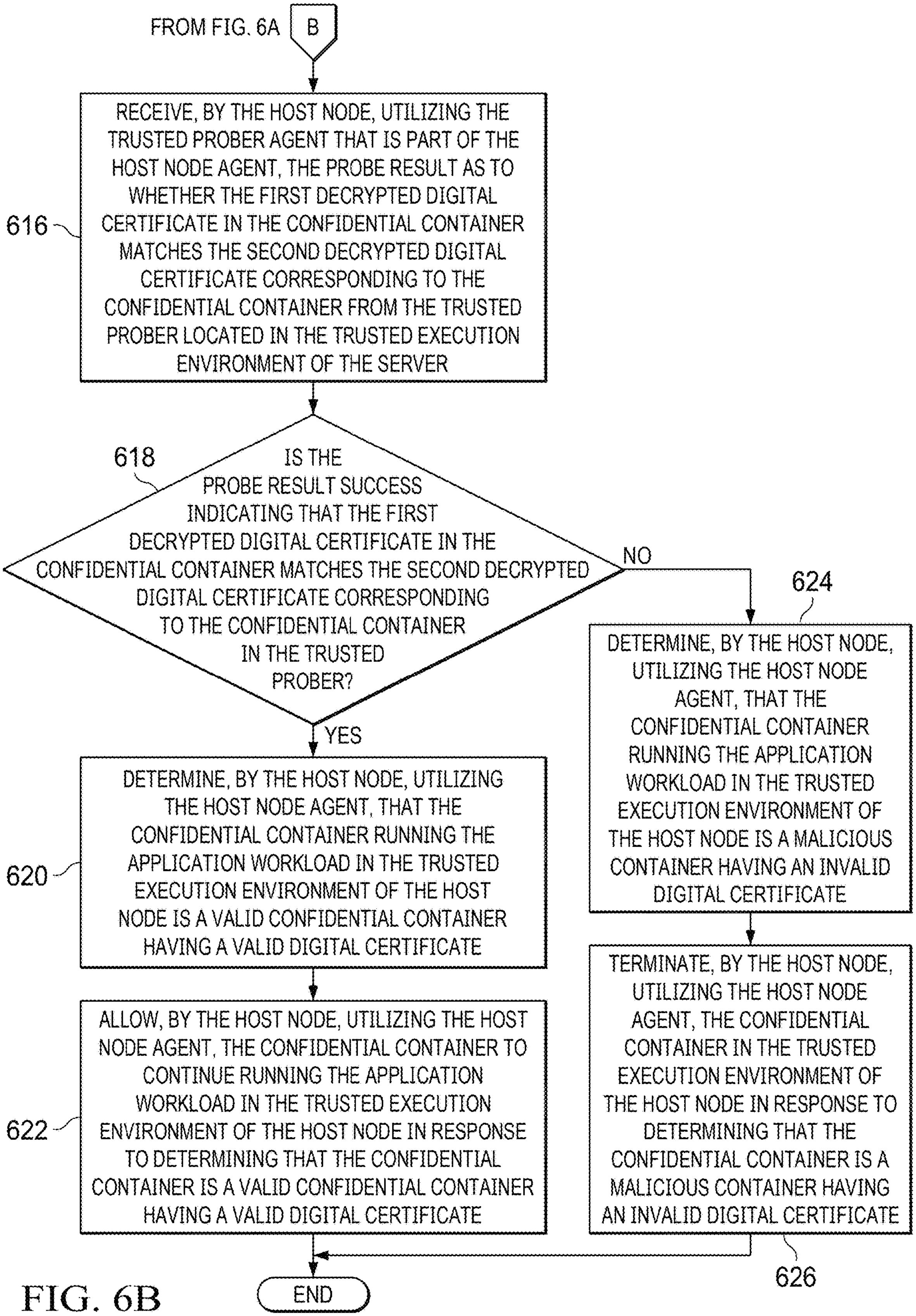

With reference now to FIGS. 6A-6B, a flowchart illustrating a process for a host node is shown in accordance with an illustrative embodiment. The process shown in FIGS. 6A-6B may be implemented in a host node, such as, for example, computer 101 in FIG. 1 or host node 208 in FIG. 2. For example, the process shown in FIGS. 6A-6B may be implemented by confidential container validation code 200 in FIG. 1.

The process begins when the host node receives a deployment of a confidential container within a trusted execution environment of the host node to run an application workload based on a container descriptor that includes initialization data and an encrypted digital certificate corresponding to the confidential container from an authorized user via a control plane command line tool located on a client device (step 602). Afterward, the host node, utilizing a host node agent, starts the confidential container within the trusted execution environment of the host node to run the application workload (step 604). The confidential container includes the encrypted digital certificate corresponding to the confidential container.

The host node, utilizing the confidential container, retrieves a decryption key corresponding to the authorized user from a trusted key broker service (step 606). The host node, utilizing the confidential container, decrypts the encrypted digital certificate in the confidential container based on the decryption key corresponding to the authorized user retrieved from the trusted key broker service to form a first decrypted digital certificate in the confidential container (step 608). In addition, the host node, utilizing an additional container within the trusted execution environment of the host node, starts a trusted prober service in the confidential container running the application workload in the trusted execution environment of the host node (step 610).

Further, the host node, utilizing a trusted prober agent that is part of the host node agent, sends a probe request to probe the first decrypted digital certificate in the confidential container to a trusted prober located in a trusted execution environment of a server (step 612). In response to sending the probe request, the host node receives the probe of the first decrypted digital certificate in the confidential container from the trusted prober located in the trusted execution environment of the server via the trusted prober service started in the confidential container by the additional container within the trusted execution environment of the host node (step 614). The trusted prober includes a second decrypted digital certificate corresponding to the confidential container for comparison to determine a probe result.

Subsequently, the host node, utilizing the trusted prober agent that is part of the host node agent, receives the probe result as to whether the first decrypted digital certificate in the confidential container matches the second decrypted digital certificate corresponding to the confidential container from the trusted prober located in the trusted execution environment of the server (step 616). The host node, utilizing the host node agent, makes a determination as to whether the probe result is success indicating that the first decrypted digital certificate in the confidential container matches the second decrypted digital certificate corresponding to the confidential container in the trusted prober (step 618).

If the host node, utilizing the host node agent, determines that the probe result is success indicating that the first decrypted digital certificate in the confidential container matches the second decrypted digital certificate corresponding to the confidential container in the trusted prober, yes output of step 618, then the host node, utilizing the host node agent, determines that the confidential container running the application workload in the trusted execution environment of the host node is a valid confidential container having a valid digital certificate (step 620). The host node, utilizing the host node agent, allows the confidential container to continue running the application workload in the trusted execution environment of the host node in response to determining that the confidential container is a valid confidential container having a valid digital certificate (step 622). Thereafter, the process terminates.

If the host node, utilizing the host node agent, determines that the probe result is fail indicating that the first decrypted digital certificate in the confidential container does not match the second decrypted digital certificate corresponding to the confidential container in the trusted prober, no output of step 618, then the host node, utilizing the host node agent, determines that the confidential container running the application workload in the trusted execution environment of the host node is a malicious container having an invalid digital certificate (step 624). The host node, utilizing the host node agent, terminates the confidential container in the trusted execution environment of the host node in response to determining that the confidential container is a malicious container having an invalid digital certificate (step 626). Thereafter, the process terminates.

Thus, illustrative embodiments of the present disclosure provide a computer-implemented method, computer system, and computer program product for validating confidential containers running application workloads in trusted execution environments and terminating malicious containers. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

receiving, by a host node, a deployment of a confidential container within a first trusted execution environment of the host node to run an application workload based on a container descriptor that includes initialization data and an encrypted digital certificate corresponding to the confidential container;

starting, by the host node, the confidential container within the first trusted execution environment of the host node to run the application workload, the confidential container includes the encrypted digital certificate corresponding to the confidential container;

determining, by the host node, whether a probe result is success indicating that a first decrypted digital certificate stored in the confidential container running in the first trusted execution environment of the host node matches a second decrypted digital certificate corresponding to the confidential container stored in a trusted prober running in a second trusted execution environment of a server;

responsive to the host node determining that the probe result is fail indicating that the first decrypted digital certificate stored in the confidential container running in the first trusted execution environment of the host node does not match the second decrypted digital certificate corresponding to the confidential container stored in the trusted prober running in the second trusted execution environment of the server, determining, by the host node, that the confidential container running the application workload in the first trusted execution environment of the host node is a malicious confidential container having an invalid digital certificate; and terminating, by the host node, the confidential container in the first trusted execution environment of the host node in response to the host node determining that the confidential container is the malicious confidential container having the invalid digital certificate.

2. The method of claim 1, further comprising:

responsive to the host node determining that the probe result is success indicating that the first decrypted digital certificate stored in the confidential container running in the first trusted execution environment of the host node matches the second decrypted digital certificate corresponding to the confidential container stored in the trusted prober running in the second trusted execution environment of the server, determining by the host node, that the confidential container running the application workload in the first trusted execution environment of the host node is a valid container having a valid digital certificate; and allowing, by the host node, the confidential container to continue running the application workload in the first trusted execution environment of the host node in response to the host node determining that the confidential container is the valid container having the valid digital certificate.

3. The method of claim 1, further comprising:

retrieving, by the host node, a decryption key from a trusted key broker service; and decrypting, by the host node, the encrypted digital certificate stored in the confidential container based on the decryption key retrieved from the trusted key broker service to form the first decrypted digital certificate stored in the confidential container.

4. The method of claim 1, further comprising:

starting, by the host node, a trusted prober service in the confidential container running the application workload in the first trusted execution environment of the host node utilizing an additional container within the first trusted execution environment of the host node.

5. The method of claim 1, further comprising:

sending, by the host node, a probe request to probe the first decrypted digital certificate stored in the confidential container running in the first trusted execution environment of the host node to the trusted prober located in the second trusted execution environment of the server; and receiving, by the host node, the probe of the first decrypted digital certificate stored in the confidential container running in the first trusted execution environment of the host node from the trusted prober located in the second trusted execution environment of the server via a trusted prober service started in the confidential container by an additional container within the first trusted execution environment of the host node, the trusted prober includes the second decrypted digital certificate corresponding to the confidential container for comparison to determine the probe result.

6. The method of claim 1, further comprising:

receiving, by the host node, the probe result as to whether the first decrypted digital certificate stored in the confidential container running in the first trusted execution environment of the host node matches the second decrypted digital certificate corresponding to the confidential container from the trusted prober located in the second trusted execution environment of the server.

7. A computer system comprising:

a processor set;

one or more computer-readable storage media; and program instructions stored on the one or more computer-readable storage media to cause the processor set to perform operations comprising:

receiving, by the computer system, a deployment of a confidential container within a first trusted execution environment of the computer system to run an application workload based on a container descriptor that includes initialization data and an encrypted digital certificate corresponding to the confidential container;

starting, by the computer system, the confidential container within the first trusted execution environment of the computer system to run the application workload, the confidential container includes the encrypted digital certificate corresponding to the confidential container;

determining, by the computer system, whether a probe result is success indicating that a first decrypted digital certificate stored in the confidential container running in the first trusted execution environment of the computer system matches a second decrypted digital certificate corresponding to the confidential container stored in a trusted prober running in a second trusted execution environment of a server;

responsive to the computer system determining that the probe result is fail indicating that the first decrypted digital certificate stored in the confidential container running in the first trusted execution environment of the computer system does not match the second decrypted digital certificate corresponding to the confidential container stored in the trusted prober running in the second trusted execution environment of the server, determining, by the computer system, that the confidential container running the application workload in the first trusted execution environment of the computer system is a malicious confidential container having an invalid digital certificate; and terminating, by the computer system, the confidential container in the first trusted execution environment of the computer system in response to the computer system determining that the confidential container is the malicious confidential container having the invalid digital certificate.

8. The computer system of claim 7, wherein the operations further comprise:

responsive to the computer system determining that the probe result is success indicating that the first decrypted digital certificate stored in the confidential container running in the first trusted execution environment of the computer system matches the second decrypted digital certificate corresponding to the confidential container stored in the trusted prober running in the second trusted execution environment of the server, determining by the computer system, that the confidential container running the application workload in the first trusted execution environment of the computer system is a valid container having a valid digital certificate; and allowing, by the computer system, the confidential container to continue running the application workload in the first trusted execution environment of the computer system in response to the computer system determining that the confidential container is the valid container having the valid digital certificate.

9. The computer system of claim 7, wherein the operations further comprise:

retrieving, by the computer system, a decryption key from a trusted key broker service; and decrypting, by the computer system, the encrypted digital certificate stored in the confidential container based on the decryption key retrieved from the trusted key broker service to form the first decrypted digital certificate stored in the confidential container.

10. The computer system of claim 7, wherein the operations further comprise:

starting, by the computer system, a trusted prober service in the confidential container running the application workload in the first trusted execution environment of the computer system utilizing an additional container within the first trusted execution environment of the computer system.

11. The computer system of claim 7, wherein the operations further comprise:

sending, by the computer system, a probe request to probe the first decrypted digital certificate stored in the confidential container running in the first trusted execution environment of the computer system to the trusted prober located in the second trusted execution environment of the server; and receiving, by the computer system, the probe of the first decrypted digital certificate stored in the confidential container running in the first trusted execution environment of the computer system from the trusted prober located in the second trusted execution environment of the server via a trusted prober service started in the confidential container by an additional container within the first trusted execution environment of the computer system, the trusted prober includes the second decrypted digital certificate corresponding to the confidential container for comparison to determine the probe result.

12. A computer program product comprising:

one or more computer-readable storage media; and program instructions stored on the one or more computer-readable storage media to perform operations comprising:

receiving, by a host node, a deployment of a confidential container within a first trusted execution environment of the host node to run an application workload based on a container descriptor that includes initialization data and an encrypted digital certificate corresponding to the confidential container;

starting, by the host node, the confidential container within the first trusted execution environment of the host node to run the application workload, the confidential container includes the encrypted digital certificate corresponding to the confidential container;

determining, by the host node, whether a probe result is success indicating that a first decrypted digital certificate stored in the confidential container running in the first trusted execution environment of the host node matches a second decrypted digital certificate corresponding to the confidential container stored in a trusted prober running in a second trusted execution environment of a server;

responsive to the host node determining that the probe result is fail indicating that the first decrypted digital certificate stored in the confidential container running in the first trusted execution environment of the host node does not match the second decrypted digital certificate corresponding to the confidential container stored in the trusted prober running in the second trusted execution environment of the server, determining, by the host node, that the confidential container running the application workload in the first trusted execution environment of the host node is a malicious confidential container having an invalid digital certificate; and terminating, by the host node, the confidential container in the first trusted execution environment of the host node in response to the host node determining that the confidential container is the malicious confidential container having the invalid digital certificate.

13. The computer program product of claim 12, wherein the operations further comprise:

responsive to the host node determining that the probe result is success indicating that the first decrypted digital certificate stored in the confidential container running in the first trusted execution environment of the host node matches the second decrypted digital certificate corresponding to the confidential container stored in the trusted prober running in the second trusted execution environment of the server, determining by the host node, that the confidential container running the application workload in the first trusted execution environment of the host node is a valid container having a valid digital certificate; and allowing, by the host node, the confidential container to continue running the application workload in the first trusted execution environment of the host node in response to the host node determining that the confidential container is the valid container having the valid digital certificate.

14. The computer program product of claim 12, wherein the operations further comprise:

retrieving, by the host node, a decryption key from a trusted key broker service; and decrypting, by the host node, the encrypted digital certificate stored in the confidential container based on the decryption key retrieved from the trusted key broker service to form the first decrypted digital certificate stored in the confidential container.

15. The computer program product of claim 12, wherein the operations further comprise:

starting, by the host node, a trusted prober service in the confidential container running the application workload in the first trusted execution environment of the host node utilizing an additional container within the first trusted execution environment of the host node.

16. The computer program product of claim 12, wherein the operations further comprise:

sending, by the host node, a probe request to probe the first decrypted digital certificate stored in the confidential container running in the first trusted execution environment of the host node to the trusted prober located in the second trusted execution environment of the server; and receiving, by the host node, the probe of the first decrypted digital certificate stored in the confidential container running in the first trusted execution environment of the host node from the trusted prober located in the second trusted execution environment of the server via a trusted prober service started in the confidential container by an additional container within the first trusted execution environment of the host node, the trusted prober includes the second decrypted digital certificate corresponding to the confidential container for comparison to determine the probe result.

17. The computer program product of claim 12, wherein the operations further comprise:

receiving, by the host node, the probe result as to whether the first decrypted digital certificate stored in the confidential container running in the first trusted execution environment of the host node matches the second decrypted digital certificate corresponding to the confidential container from the trusted prober located in the second trusted execution environment of the server.

* * * * *